Aug. 26, 1924.

Re. 15,904

G. N. HEIN

SUN AND GLARE SHADE FOR VEHICLES

Original Filed Oct. 17, 1921

Inventor,
G. N. Hein
By Acker & Totten
Attorneys.

Reissued Aug. 26, 1924. Re. 15,904

UNITED STATES PATENT OFFICE.

GEORGE N. HEIN, OF SAN FRANCISCO, CALIFORNIA.

SUN AND GLARE SHADE FOR VEHICLES.

Original No. 1,459,180, dated June 19, 1923, Serial No. 508,368, filed October 17, 1921. Application for reissue filed September 11, 1923. Serial No. 662,092.

*To all whom it may concern:*

Be it known that I, GEORGE N. HEIN, a citizen of the United States, residing at the city and county of San Francisco and State of California, have invented certain new and useful Improvements in Sun and Glare Shades for Vehicles, of which the following is a specification.

The present invention relates to an apparatus designed for use in connection with windows or openings generally, but more particularly designed for use in connection with the transparent windshield of a motor driven vehicle enabling variation of the top and bottom limits of the sight opening therethrough, varying the vertical width of the said opening and its position horizontally of the windshield, reducing the direct and reflected glare passing through the windshield without in any manner affecting the lateral vision therethrough. Sunshades and glare shields have been provided for automobile windshields for overcoming the glare to the eyes of the operator occasioned by the direct rays of the sun, and all of said devices are associated with the upper portion of the shield and are moved downwardly thereover.

By actual use, it has been discovered that the reflected glare from the road and vehicle, as for example, the hood and fenders thereof, is equally as objectionable and dazzling, and in fact tiring to the eyes as direct rays of the sun passing through the windshield and into the eyes of the operator, and the present invention has for its principal object to eliminate the direct rays of the sun from the eyes of the operator, as well as the indirect or reflected rays when it is desired, and at the same time affording a sight or driving opening for the operator which may be quickly varied as to horizontal position, and also as to width when interfering with the lateral vision through the windshield.

The invention consists broadly in providing adjustable means associated with one face of a transparent window or windshield adjacent to its upper and lower edges and adapted for vertical movement thereover for providing the upper and lower edges of a sight or vision opening, and in associating with said means simple devices and parts for attaching or securing the same in position and for controlling the adjustment thereof.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1:
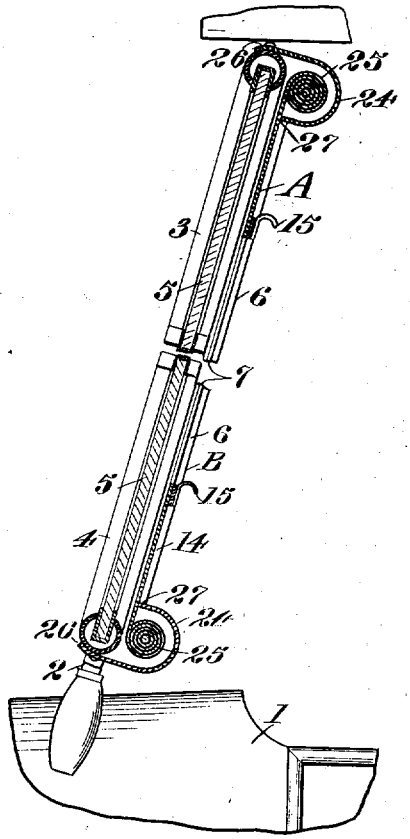
Figure 1 is a view in vertical section through the conventional form of windshield illustrating my invention applied thereto.
Figure 2:
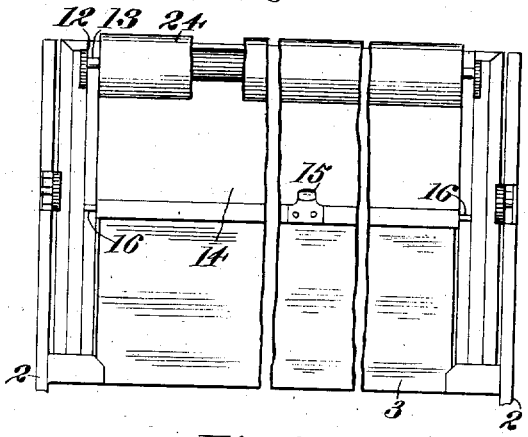
Fig. 2 is a broken view in front elevation of the upper section of the windshield with my invention applied thereto.
Figure 3:
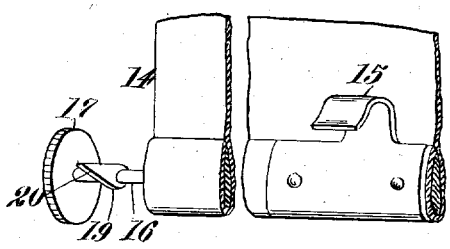
Figure 3 is a fragmentary view in detail of one corner of the free edge of one of said curtains, illustrating the guide roller and retaining pawl.
Figure 4:
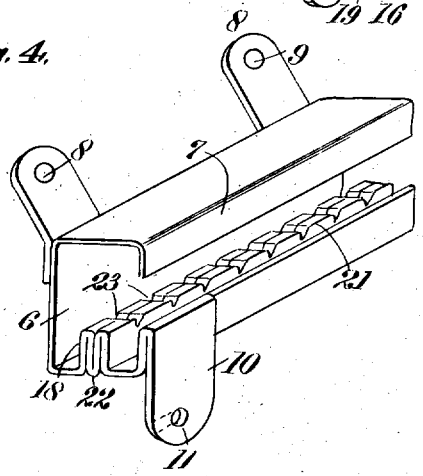
Figure 4 is a view in perspective of one of the guides illustrating the internal rack and the bracket mounting for one end of a curtain roller.

In the drawings, wherein like characters of reference designate corresponding parts, 1 indicates a portion of a vehicle body upwardly from which extend the parallel spaced windshield supports 2, between which are pivotally mounted the upper and lower windshield frames 3 and 4, each provided with a transparent glass or closure member 5.

Disposed parallel with the inner faces of the side portions of the upper and lower frames 3 and 4 are suitable guides 6 illustrated as constructed of sheet metal and provided in one side with a vertical slot or opening 7. The guides 6 are each provided with laterally extending portions or loops 8 formed with apertures 9 through which are adapted to extend securing means or screws, not shown, for attaching the guides to the side members and the shield frames. The guides are arranged on the shield frames with their slotted portions 7 opposing each other, and at corresponding ends said guides are formed with a laterally bent or flanged portion 10, provided with an eye 11, for receiving the bearing ends 12 of said rollers 13 extended longitudinally of the upper and lower edges of the shield frames 3 and 4, as illustrated in Figure 1. These rollers 13 are of the conventional well known type of roller employed for mounting window shades, and which are commonly termed "Spring Shade Rollers," and each roller carries a flexible opaque curtain 14 which is adapted to be wound thereon and unwound therefrom, and it will be observed from Figure 1 that the curtains are adapted to be drawn toward each other from the top and bottom of the windshield, and the space between the meeting edges thereof affords a driving or sight opening for the vehicle operator through the transparent shield. Each curtain is of a width approximately equal to that of the transparent portions 5, and on its free edge carries a finger piece 15, and outwardly from each end extends a rod 16 mounting on its end a guide roller 17 for operating within the track 18 in the guide 6, the rod 16 extending thereinto through the slot 7. Fixed to the rod 16 is a pawl 19 having a pointed end 20 which is adapted for engaging rack teeth 21 on the inner face of the front portion of the guide 6, when pressure is released from the finger piece 15, and it is desired to retain the curtain in its adjusted position. It will be observed that the rack is formed within the guide 6 by inwardly bending a portion of one side wall thereof, as at 22, and inwardly cutting into the edges of said bent portion, as at 23, to form the teeth 21. For concealing the rollers 13 with their shafts mounted therein, I employ open ended curved protectors or shields 24, each formed with a longitudinal pocket 25 therein for receiving the roller with its shade, and said protectors are secured to the horizontal edges of the frames 3 and 4 by the attaching members 26, each of these opposing edges disposed in slight spaced relation to the inner face of the glass 5, affording a slot 27 through which the curtains are drawn in their movement over the transparent window portion 5.

In operation, the vehicle operator grasps the finger piece 15 of either curtain, presses or forces the same inwardly releasing the pawl 19 from a tooth 21 of the rack 22 leaving the shade free to be moved longitudinally in the guide 6 until such time as the operator has positioned the free edge A of the upper shade and the free edge B of the lower shade in the positions desired—the upper to exclude from his eyes the direct rays and the lower to exclude the reflected or indirect rays, thereby providing a sight opening through which the view of the road surface may be had for the full transverse width of the windshield, whereby the lateral view is not impaired.

On the operator releasing the grip on the finger piece 15, the tendency of the free end of the shade to curl causes the pawl 19 to engage one of the teeth 21 and retain the shade in its adjusted position.

I claim:

1. In combination with a support, a pair of parallel spaced rollers carried thereby, a window associated with said support, a flexible curtain carried by each of said rollers, the free edges of said curtains adapted for independent free movement in the same plane to and from each other to provide a sight opening through said window between said curtain edges variable as to width and position, and means carried by the free edge of each curtain for releasably retaining said edge in its adjusted position.

2. In combination with a vehicle windshield including a frame, a pair of non-transparent members carried at the respective top and bottom edges of the frame, said non-transparent members adapted for movement from and independent of each other to enable their free edges to obstruct the view through said frame and to afford between them a sight opening variable as to width and variable as to horizontal position vertically of the frame.

3. In combination with a transparent vehicle windshield, adjustable light-shading means moving parallel with the windshield and arranged to cover upper and lower portions of said windshield above and below the line of sight, and means for adjusting said light-shading means vertically to vary the height of the top and bottom limits of the sight opening through the windshield.

4. In combination with a vehicle windshield, consisting of a transparent pane, adjustable non-transparent light shading members operatively positioned one near the top and the other near the bottom edge of the pane, at least one of said members moving parallel with the windshield pane toward the other, said light shading members arranged to restrict the vision through the upper and lower portions of said windshield pane above and below the normal line of sight, and means for adjusting at least one of said light shading members toward the other to vary the position of the limits of the sight opening through the pane.

July 24th, 1923, San Francisco, Cal.

GEORGE N. HEIN.